United States Patent
Jones et al.

(10) Patent No.: US 7,165,111 B2
(45) Date of Patent: *Jan. 16, 2007

(54) SYSTEM AND METHOD TO IDENTIFY DEVICES EMPLOYING POINT-TO-POINT-OVER ETHERNET ENCAPSULATION

(75) Inventors: Kenneth Roger Jones, Cool, CA (US); Brian Gonsalves, Antioch, CA (US)

(73) Assignee: SBC Knowledge Ventures, L.P., Reno, NV (US)

( * ) Notice: Subject to any disclaimer, the term of this patent is extended or adjusted under 35 U.S.C. 154(b) by 57 days.

This patent is subject to a terminal disclaimer.

(21) Appl. No.: 10/634,116

(22) Filed: Aug. 4, 2003

(65) Prior Publication Data
US 2005/0033853 A1 Feb. 10, 2005

(51) Int. Cl.
*G06F 15/16* (2006.01)
(52) U.S. Cl. .............. 709/227; 709/217; 709/222
(58) Field of Classification Search .......... 709/226, 709/217, 223, 230, 218, 219, 227, 222; 370/356, 370/352
See application file for complete search history.

(56) References Cited

U.S. PATENT DOCUMENTS

| | | | |
|---|---|---|---|
| 6,327,511 B1 * | 12/2001 | Naismith et al. ............. | 700/19 |
| 6,404,861 B1 | 6/2002 | Cohen et al. | |
| 6,496,859 B1 * | 12/2002 | Roy et al. .................... | 709/223 |
| 2002/0095299 A1 * | 7/2002 | Iwakata .......................... | 705/1 |
| 2003/0053443 A1 * | 3/2003 | Owens ......................... | 370/352 |
| 2004/0071133 A1 * | 4/2004 | Yusko et al. ................. | 370/356 |
| 2004/0105444 A1 * | 6/2004 | Korotin et al. ........... | 370/395.5 |
| 2005/0129002 A1 * | 6/2005 | Koo ............................ | 370/352 |

OTHER PUBLICATIONS

RFC 2516—A Method for Transmitting PPP Over Ethernet (PPPoE), Feb. 1999 by Mmakos et al.*
L. Mamakos, "A Method for Transmitting PPP Over Ethernet (PPPoE),"[online] Network Working Group Request fro Comments: 2516; 15 pp., Retrieved from the Internet Aug. 1, 2003 at URL <http://ietf.org/rfc/rfc2516.txt?number=2516 >, Feb. 1999.

* cited by examiner

*Primary Examiner*—Rupal Dharia
*Assistant Examiner*—Djenane M. Bayard
(74) *Attorney, Agent, or Firm*—Toler Schaffer, LLP

(57) ABSTRACT

A method and system for use in identifying customer premises equipment (CPE) in a distributed network are presented. The method utilizes a unique identifier provided by a CPE device to an access concentrator during the discovery stage of PPPoE communications in a distributed network. The access concentrator receives the unique identifier and stores the identifier in a database for use in identifying and managing CPE devices attached to a service provider's network. A system for identifying a communications device includes an access server and a database server. The access server is configured to receive an active discovery packet from a communications device. The active discovery packet has a tag comprising a device identifier field. The device identifier field is embedded in the tag by a module in the communications device, e.g., CPE device.

35 Claims, 7 Drawing Sheets

SYSTEM AND METHOD TO IDENTIFY DEVICES EMPLOYING POINT-TO-POINT-OVER ETHERNET ENCAPSULATION

BACKGROUND

1. Field of the Invention

The present disclosure relates to point-to-point-over-Ethernet (PPPoE) service.

2. Description of the Related Art

Broadband service providers for distributed computing network services such as digital subscriber line (DSL) service typically require the end user, e.g., the home or business DSL subscriber, to employ a router, switch, or other customer premises equipment (CPE) to terminate the DSL connection at the residence or business location. The router or other CPE serves to terminate the Asynchronous Transfer Mode (ATM) connection, and generally utilizes point-to-point-over-Ethernet (PPPoE) enabled software to complete the user authentication process.

When a DSL subscriber encounters a problem with their DSL connection, the DSL service provider has no way to automatically determine the specific make and/or model of a particular CPE device being utilized by the DSL subscriber. In this situation, telephone inquiries to the subscriber are made to attempt to discover what type of equipment is being utilized at the CPE location, or a service technician is dispatched to "eyeball" the equipment when the customer does not know what type of CPE device is at their location. Consider a typical case of tens of thousands (or even millions, in some cases) of DSL subscribers and their respective CPE devices, and the support problems presented to the DSL service provider become evident.

In addition, when a service provider wishes to upgrade DSL transport services in their service area(s), e.g., the provision of Point to Point Protocol Termination and Aggregation (PTA), it may be difficult to cost-effectively deploy the new service plan if the service provider does not know what types of CPE devices are currently deployed. For example, if a new transport service is scheduled for deployment in a specific geographic region, but it is determined that a large number of CPE devices may not support the new service, delays in deployment result. Such delays lead to increased provider costs, which are typically passed along to the subscribers, resulting in higher rates.

Accordingly, there is a need for a system or method which is capable of automatically identifying CPE devices in a service provider's service area.

SUMMARY

In a particular embodiment, a method for identifying customer premises equipment (CPE) in a distributed network is presented. The method includes generating a device identifier code in response to receiving a point-to-point over Ethernet (PPPoE) packet communicated over the distributed network. A PPPoE active discovery initiation (PADI) packet is broadcast. The PADI packet includes a tag, such as a host-uniq tag, that specifically identifies a product model of a CPE device. A PPPoE active discovery offer (PADO) packet is received by the CPE. The CPE transmits a PPPoE active discovery request (PADR) packet in response to receiving the PADO packet. The PADR packet includes a tag that specifically identifies a product model of the CPE device. The CPE receives a PPPoE active discovery session (PADS) packet, and an Ethernet session is conducted.

In a particular embodiment, a method is presented for sending a point-to-point over Ethernet (PPPoE) active discovery packet. The PPPoE active discovery packet includes a tag that specifically identifies a product model of a customer premises equipment (CPE) device.

In a further embodiment, a disclosed method includes receiving a PPPoE active discovery packet. This packet is a PPPoE active discovery offer (PADO) packet in one embodiment, while the packet may be a PPPoE active discovery session (PADS) packet in another embodiment. The packet includes a tag that identifies a product model of a CPE device. The product model of the CPE device is determined based on the tag.

In a particular embodiment, a customer premises equipment (CPE) device is disclosed. The CPE device includes a network interface and a module coupled to the network interface. The module is configured to transmit a PPPoE active discovery packet including a tag. The tag includes a device identifier field that uniquely identifies a CPE product model.

In another embodiment, a system for identifying a communications device is presented. The system includes an access concentrator and a database server. The access concentrator is configured to receive an active discovery packet having a tag including a device identifier field. The active discovery packet is arranged for transmission by a communications device capable of terminating a point-to-point connection. The device identifier field uniquely identifies a product model associated with the communications device. The database server stores the device identifier field.

BRIEF DESCRIPTION OF THE DRAWINGS

The use of the same reference symbols in different drawings indicates similar or identical items.

DESCRIPTION OF THE DRAWINGS

The present disclosure provides a method, system, and apparatus for use in identifying customer premises equipment (CPE) in a distributed network. The method utilizes a unique identifier that is provided by a CPE device to an access concentrator during the discovery stage of point-to-point over Ethernet (PPPoE) communications in a distributed network. An access concentrator collects this CPE-provided information, which may be used by a broadband service provider to identify, and thus manage, the CPE devices which form a part of the service provider's network domain. An example of a distributed network system including a collection of domains with one or more networks is illustrated in FIG. 1.

Figure 1:
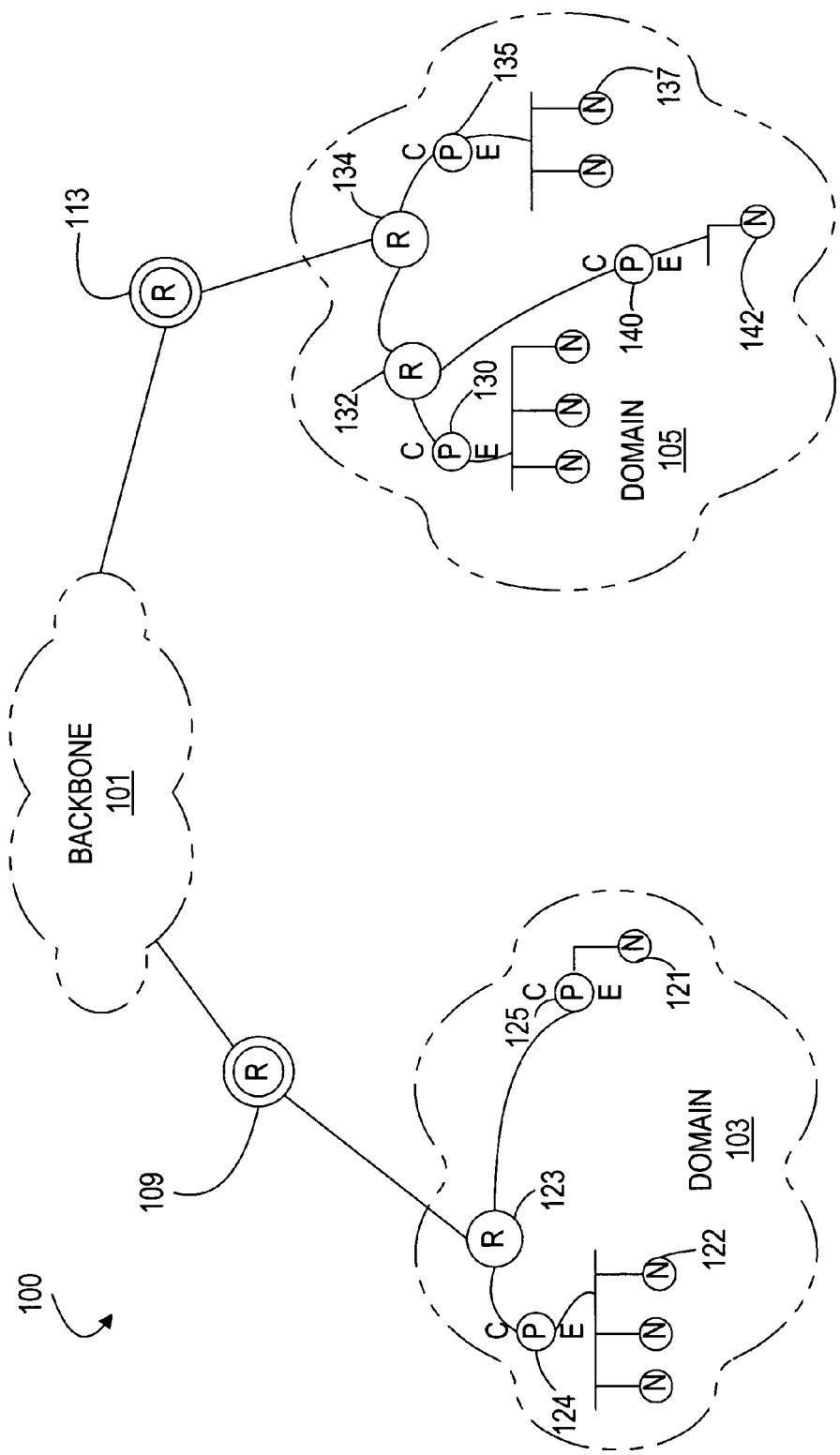
FIG. 1 is a simplified diagram of a distributed network.

FIG. 1 is a simplified example of a distributed network, and is referred to as distributed network system 100. Distributed network system 100 can include numerous routing domains 103 and 105, which are connected to a backbone network 101. In a hierarchically arranged network system, backbone 101 is the central connection path shared by the nodes and networks connected to it. The backbone 101 administers the bulk of traffic between communicating nodes to provide end-to-end service between one user, for example, source node 121 in domain 103, and another user, for example destination node 142.

Each routing domain 103, 105 in distributed network system 100 is a collection of one or more local networks that are attached to the backbone 101 through one or more routers 123, 124, 125, 130, 132, 134, and 135. A router is a specialized computer for processing Internet protocol (IP) data and forwarding IP data along respective network paths. In the following discussion, the term local network shall be used to refer to all types of networks that may be included in a domain. Routing domains 103 and 105 are also referred to as autonomous systems (AS). An autonomous system is a set of nodes and routers that operate under the same administration. The domains 103 and 105 may be operated by the same service provider (same administration) or by different service providers. The networks in routing domains 103 and 105 may be residence/subscribers' home networks, local area networks (LAN), wide area networks (WAN), metropolitan area networks (MAN), or the like.

In a point-to-point (PPP) connectivity network, various types and models of CPE devices such as CPE devices 124 and 125, or 130, 140, and 135 are used to terminate the point-to-point (PPP) connections. One type of point-to-point connectivity communications is point-to-point over Ethernet (PPPoE). With various types of broadband access, e.g. digital subscriber line (DSL) service, connectivity may be provided via PPPoE within the domains 103 and 105. It will be appreciated that the numbers of networks, routers, CPE devices, and nodes (nodes are depicted by a circle with 'N' inscribed within the circle) have been constrained in the example of FIG. 1 to avoid clutter.

Broadband access service, such as digital subscriber line (DSL) service, entails the use of a CPE device to terminate the DSL (PPPoE) connection at the residence or business location of the DSL subscriber. This is illustrated in FIG. 2, which illustrates a simplified diagram of a point-to-point connection being established.

Figure 2:
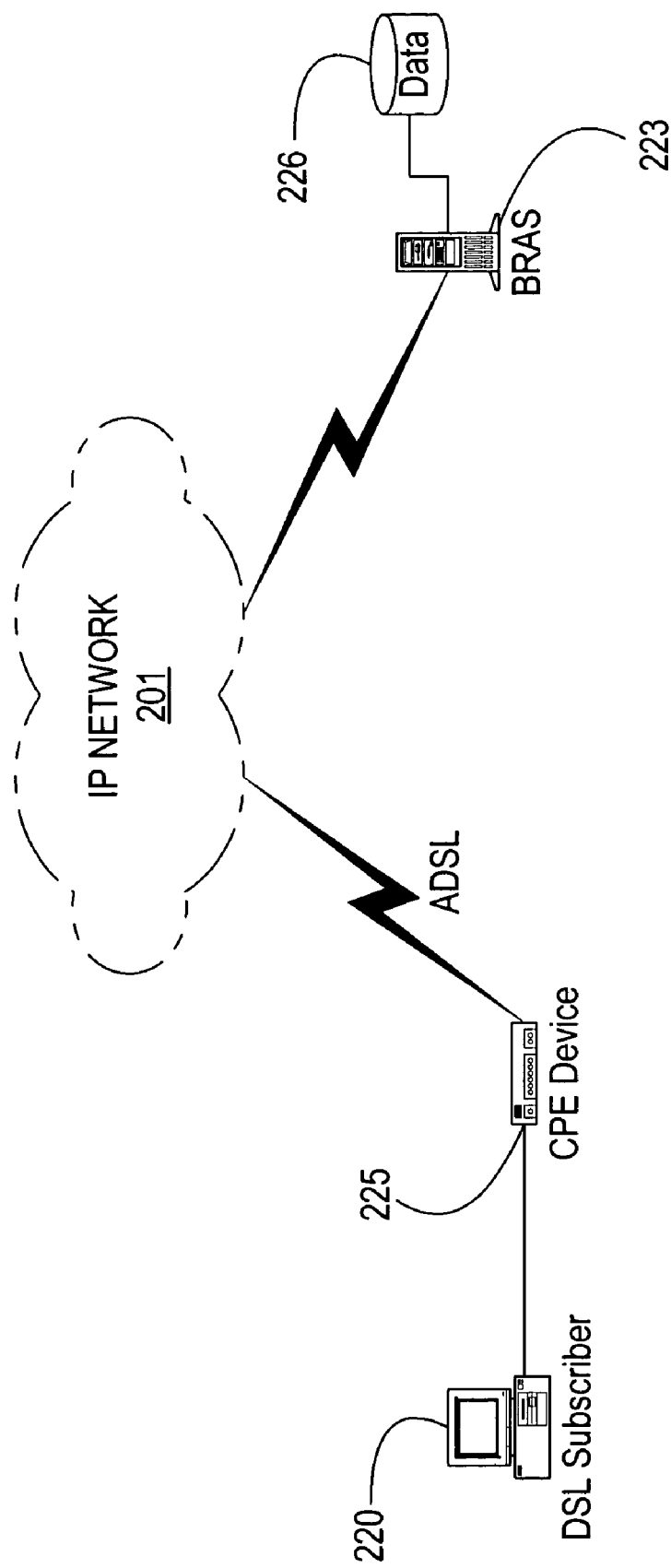
FIG. 2 is a simplified diagram of a customer premises equipment (CPE) device connected via an IP network to an access concentrator.

FIG. 2 illustrates a CPE device 225 connected through an IP network 201 to an access concentrator 223. In an embodiment, the access concentrator 223 is a broadband remote access server (BRAS).

Typically, the CPE device 225 terminates the asynchronous transfer mode (ATM) connection, and has point-to-point over Ethernet (PPPoE) software to complete a user authentication process. The CPE device 225 may be a router or a switch, or any device that terminates a PPPoE connection. The CPE device 225 contains a module configured to transmit a PPPoE packet including a tag to uniquely identify the CPE device 225 product model. Access concentrator 223 is connected to a database 226 to store the device identifier field data obtained from the CPE device 225 during discovery/authentication processes. The method utilizes the packet exchange during the conduct of a PPPoE discovery process.

Figure 3:
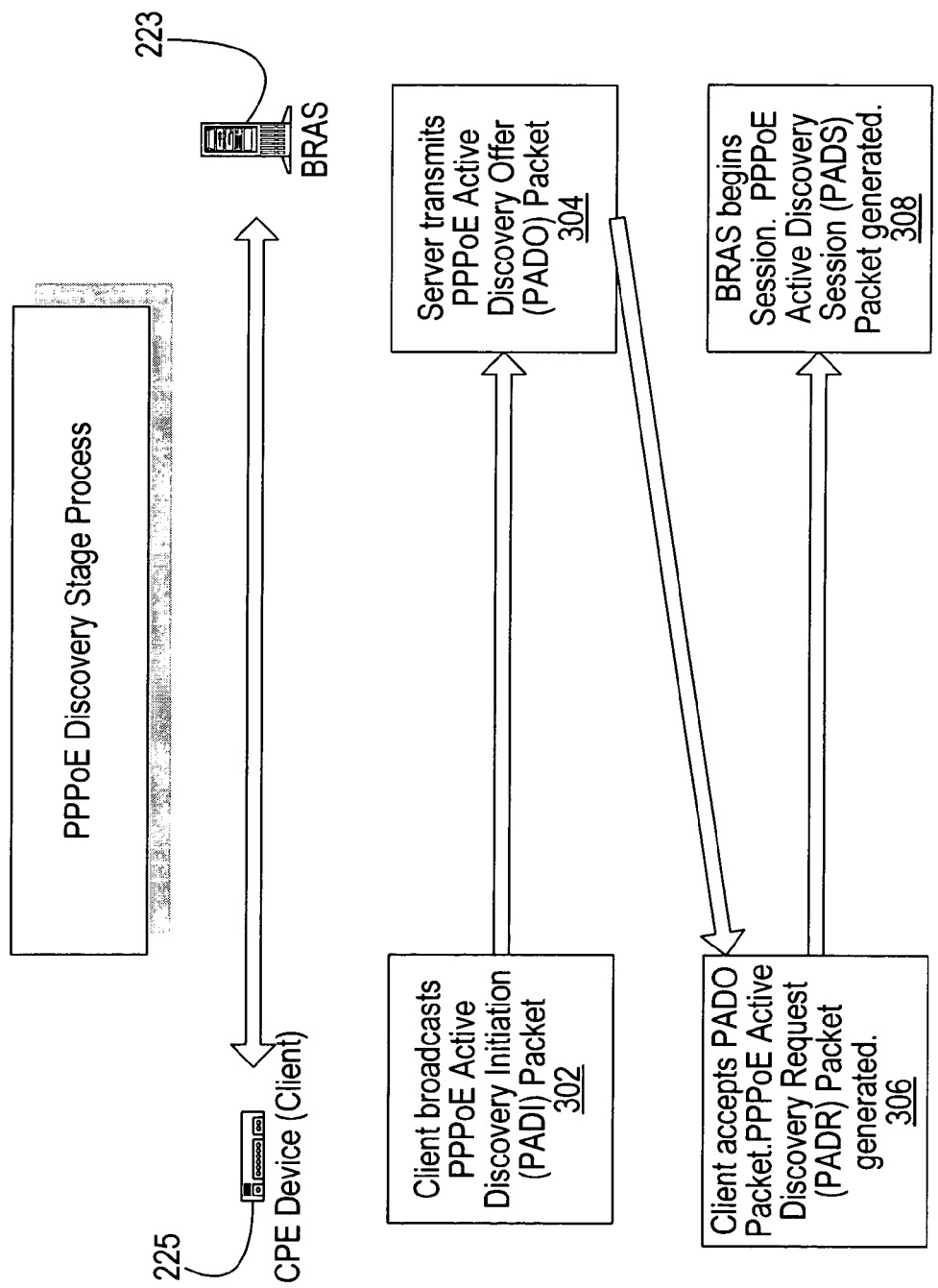
FIG. 3 is a flow diagram illustrating the stages of PPPoE discovery.

PPPoE has two distinct stages, a discovery stage, and a PPP session stage. When a host wishes to initiate a PPPoE session, it first performs discovery to identify the Ethernet media access control (MAC) address of the peer, and establishes a PPPoE SESSION_ID. Although PPP defines a peer-to-peer relationship, discovery is a client-server relationship. That is, in the discovery process, a host (the client, or CPE device 225) discovers an access concentrator 223 (the server), and various discovery steps are followed to permit the host and the server to have the information required to build their point-to-point connection over Ethernet. This discovery process is illustrated in FIG. 3.

The method and system disclosed herein utilizes a tag identified in Internet Engineering Task Force (IETF) RFC 2516 (A Method for Transmitting PPP over Ethernet (PPPoE)) in an innovative way to determine which CPE devices, such as CPE device 225, are connected to a network. The client (CPE 225) is capable of generating a device identifier code in response to receiving a PPPoE packet communicated over a distributed network. In the first step 302 of the discovery process, the CPE device 225 broadcasts a PPPoE active discovery initiation (PADI) packet. This PADI packet includes a tag that specifically identifies a product model of the CPE device 225. The tag in a particular embodiment is a host-uniq tag, and the device identifier code is a binary number associated with a specific product model or type of CPE device. In a specific embodiment, the binary number is a nine bit binary number.

The access concentrator 223, such as the broadband remote access server (BRAS), transmits a PPPoE active discovery offer (PADO) packet in step 304. In step 306, the PADO packet is received by the client 225, and accepted. In response to the PADO packet receipt, an active discovery request packet (PADR) packet is generated and transmitted to the server 223. The PADR packet can also include a tag that specifically identifies a product model of the CPE device 225. In step 308, the server receives the PADR packet, and generates and transmits a PPPoE active discovery session (PADS) confirmation packet. The session discovery process is concluded, and an Ethernet communication session is then conducted between the client 225 and the server 223.

The host-uniq tag information may be transmitted in the PADI packet. Alternatively, the host-uniq tag information may also be transmitted in the PADR packet. Generally it is most efficient to utilize the PADI packet for device identification, however, the CPE device could return the device identifier in the tag with a PADR packet as well. Whether the tag information is contained in the PADI or PADR packets, the access concentrator 223 receives the PAD packet, and stores the device identifier code in a database (226, FIG. 2). After collection of the device identifier codes in the tag, the database can be used to determine the specific product model of a CPE device based on the information embedded in the tag. This information is then available to be provided to customer service representatives to diagnose and repair user problems, thereby decreasing the number of customer site visits and subscriber call requests required of service technicians.

An advantage provided by the disclosed method is that it facilitates network management based upon the product model of the CPE devices determined to be present in the network. For example, the use of the host-uniq tag and the unique device identifier allows broadband service providers to check on the CPE devices in use on the provider's network. This information could be used to target marketing efforts, or to enable surveys of existing equipment to determine if the existing equipment will work with new technologies that a broadband service provider would like to deploy. It should be noted that although the examples provided thus far have discussed primarily DSL broadband services, PPPoE is an authentication system that is not restricted to DSL.

Figure 4:
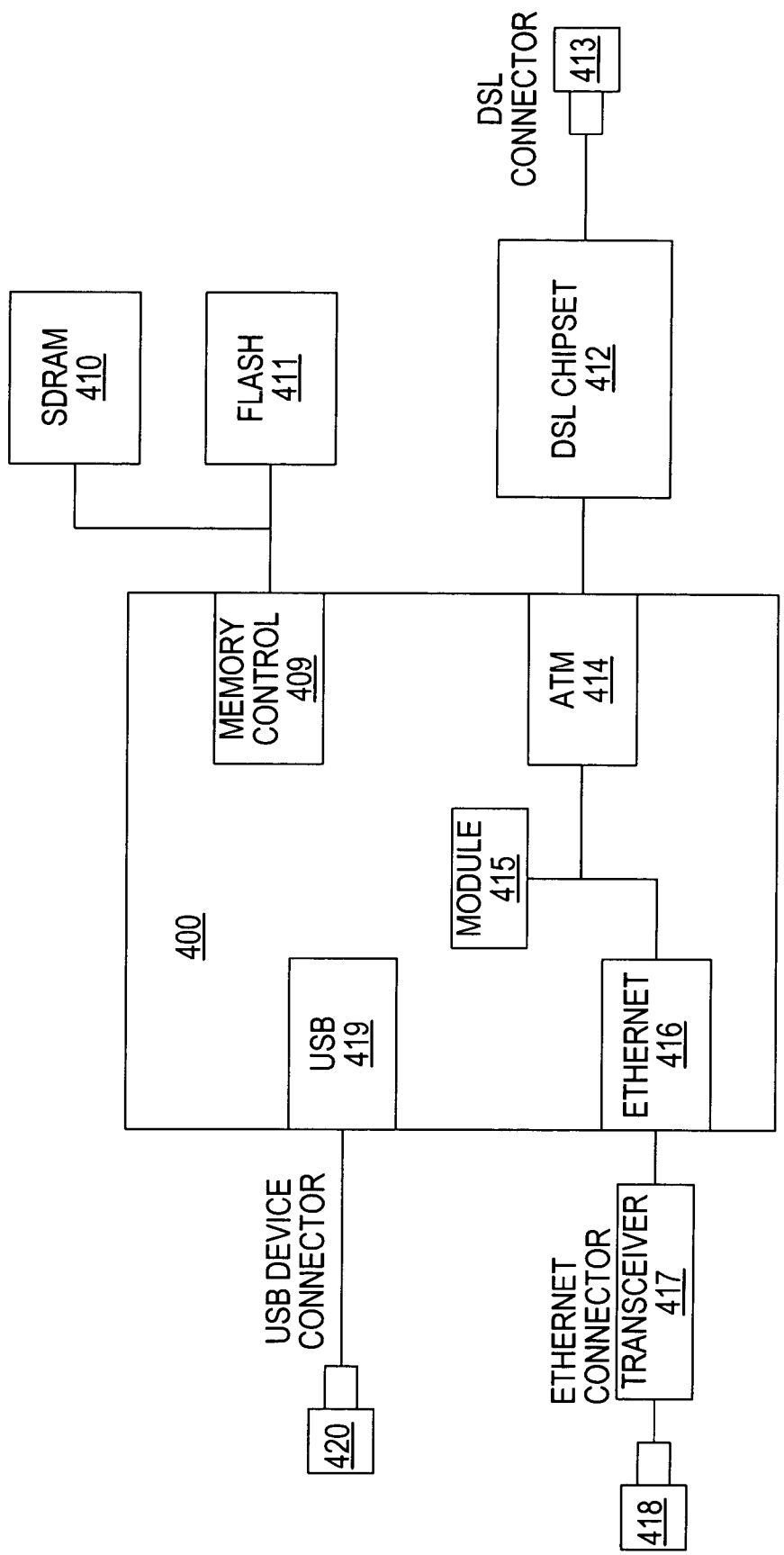
FIG. 4 is a block diagram of an ADSL bridge/router board which incorporates a module configured to transmit a point-to-point over Ethernet (PPPoE) active discovery packet, including a tag.

FIG. 4 is a block diagram of an ADSL bridge/router board 400 incorporating a module 415 configured to transmit a point-to-point over Ethernet (PPPoE) active discovery packet including a tag. In a particular embodiment, the tag comprises a device identifier field that uniquely identifies a CPE product model. It will be appreciated that, with the exception of module 415, the block diagram of FIG. 4 is provided as a generic example of an integrated microprocessor designed to meet the needs of communications applications, and as such does not represent the only architecture possible for CPE devices.

CPE board 400 includes a memory control module 409 with connecting Flash 411 and SDRAM 410 memory components. Other components in board 400 include a universal serial bus (USB) controller 419 and a USB device connector 420; an ATM segmentation and reassembly (SAR) controller module 414; a DSL chipset 412 and DSL connector 413; a 10/100 Mbps Ethernet controller module 416, transceiver 417, and connector 418. ATM controller module 414 and Ethernet controller module 415 have been integrated into the board 400 as network interfaces.

During a PPPoE discovery process, module 415 sends a PPPoE active discovery (PAD) packet. The PAD packet includes a tag comprising a device identifier field that uniquely identifies a CPE product model. The device identifier field can also be generated in response to receiving a PAD packet. The PAD packet containing the tag/device identifier can be a PADI packet, or alternately, a PADR packet. In one embodiment, the tag is a host-uniq tag, and the device identifier field comprises a predefined binary number embedded in the host-uniq tag. This predefined binary number can be a nine-bit binary device identifier code.

Figure 5:
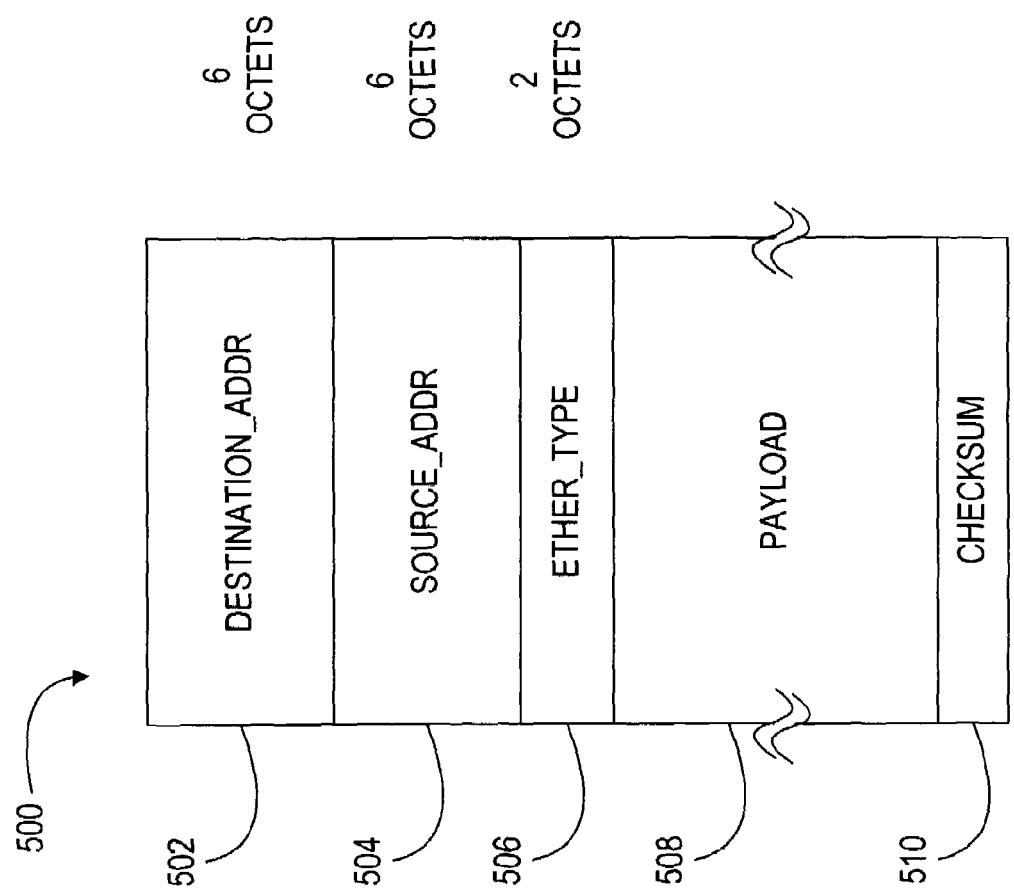
FIG. 5 illustrates a data packet for use in a distributed network.

FIG. 5 illustrates a data packet 500 for use in a distributed network. The data packet 500 includes a destination address field (DESTINATION_ADDR) 502 which typically contains either a unicast Ethernet destination address, or the Ethernet broadcast address (0xffffffff). For discovery packets, the field 502 value is either a unicast or a broadcast address. For PPP session traffic, the field 502 value contains the peer's unicast address as determined from the discovery stage.

A source address field (SOURCE_ADDR) 504 is also contained in data packet 500. This field 504 contains the Ethernet media access control (MAC) address of the source device. The ETHER_TYPE field 506 is set to a first value during the discovery stage, or to a second value during the PPP session stage. The payload field 508 contains the Ethernet payload for PPPoE, and is discussed in detail in FIG. 6. The checksum field 510 serves to verify packet integrity.

Figure 6:
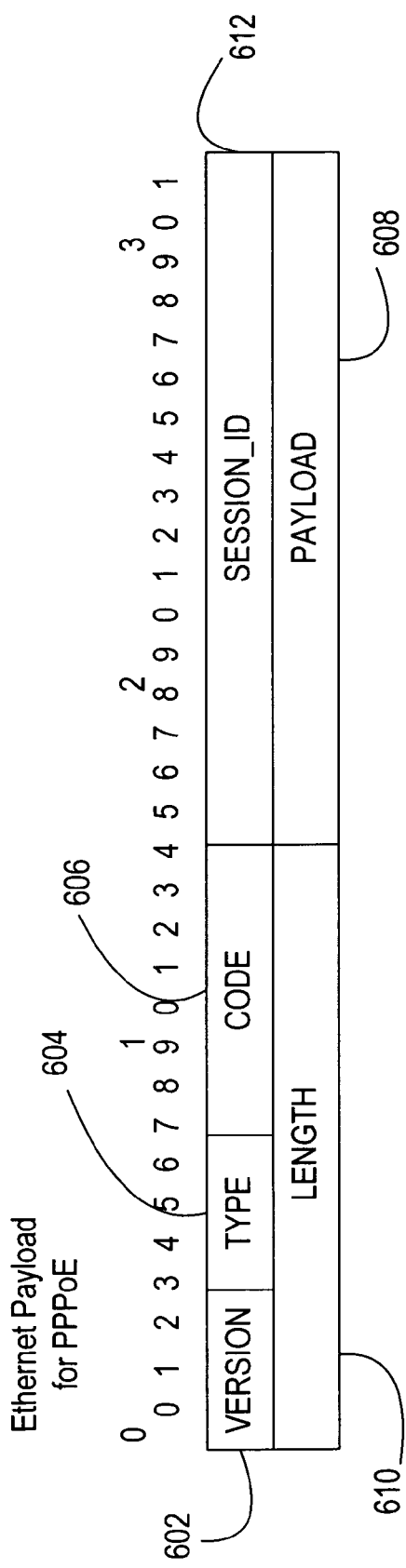
FIG. 6 illustrates an Ethernet payload for point-to-point over Ethernet (PPPoE)

FIG. 6 illustrates an illustrative Ethernet payload that may be used with PPPoE. The VERSION field 602 is four bits, and identifies the version number of the PPPoE specifications, e.g., 0x1. The TYPE field 604 is four bits, and identifies the Ethernet type for a given version of PPPoE specifications. The CODE field 606 is eight bits, and the CODE field value depends upon whether discovery stage or PPP stage is in effect.

The SESSION_ID field 612 is 16 bits, and is an unsigned value in network byte order. For a given PPP session, the field 612 is fixed, and defines a PPP session along with the Ethernet source address (504 in FIG. 5) and destination address (502 in FIG. 5). In the discovery stage, the SESSION_ID field 612 has a different value depending upon the type of discovery packet in which field 612 is contained. The LENGTH field 610 is 16 bits having a value, in network byte order, that indicates the length of the PPPoE payload 608.

Figure 7:
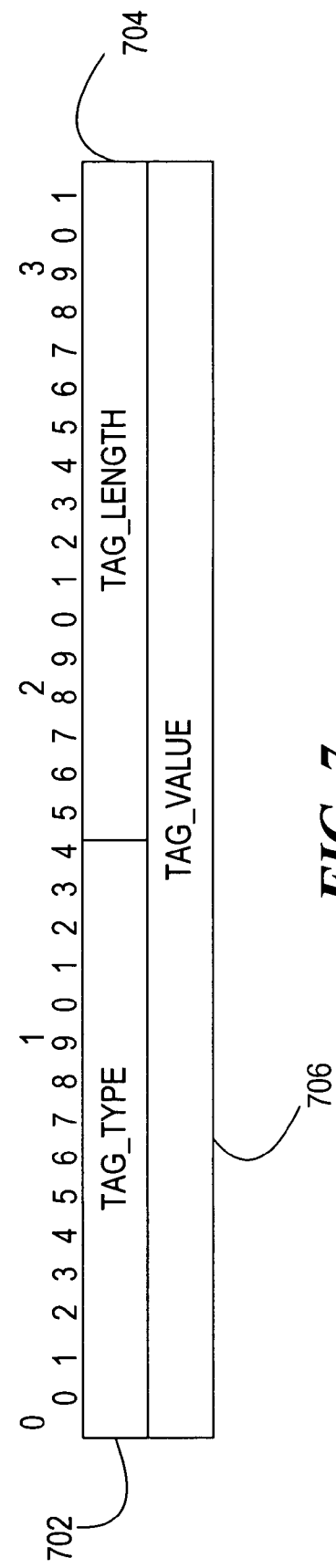
FIG. 7 illustrates a tag for use in an Ethernet payload.

A PPPoE payload 508 contains zero or more tags. A tag is a type-length-value (TLV) construct, and an example tag is shown in FIG. 7. The sample tag includes a TAG_TYPE field 702 that is a 16 bit field in network byte order. A list of tag types that may be present in the field 702 includes tag types end-of-list, service-name, AC-name, host-uniq, and AC-cookie tags. The TAG_LENGTH field 704 is 16 bits, and is an unsigned number in network byte order which indicates the length in octets of the TAG_VALUE 706.

IETF RFC 2516 defines the host-uniq tag as follows: "This tag is used by a host to uniquely associate an access concentrator response (PADO or PADS) to a particular host request (PADI or PADR). The TAG_VALUE is binary data of any value and length that the host chooses. It is not interpreted by the access concentrator. The host may include a host-uniq tag in a PADI or PADR. If the access concentrator receives this tag, it must include the tag unmodified in the associated PADO or PADS response." From the foregoing IETF definition, it should be clear that although the present disclosure utilizes a predefined tag, the tag is utilized in a unique way to identify CPE devices, as well as to collect CPE device information at the access concentrator or database server attached to the access concentrator, for network management purposes.

Figure 8:
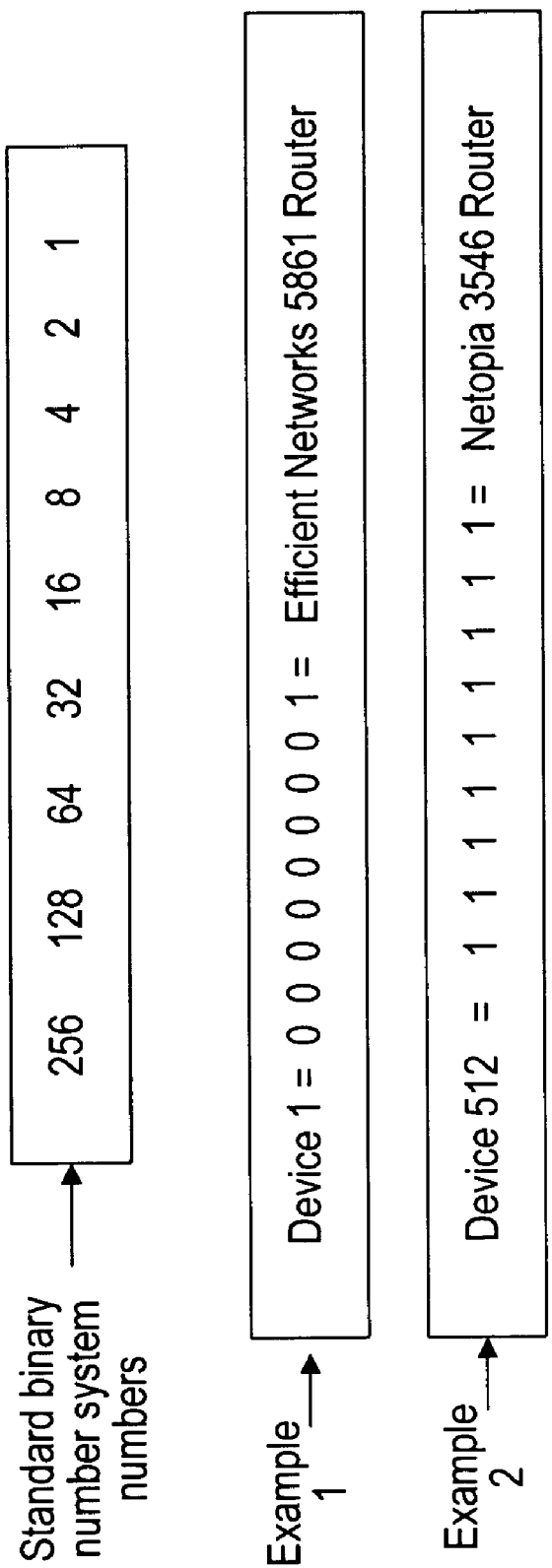
FIG. 8 illustrates an example of a nine binary bit CPE device identifier code embedded in the 0x0103 host-uniq tag.

An example of a nine bit binary CPE device identifier code embedded in a host-uniq tag is illustrated in FIG. 8. The CPE device identifier code uses numbers in the standard binary number system to produce any particular CPE device number between 0 and 512. In Example 1 of FIG. 8, an Efficient Networks 5861 Router has the binary number 000000001, making its device binary number equal to 1. In Example 2, a Netopia 3546 Router has the binary number 111111111, making its device binary number equal to 512. Using the examples of FIG. 8, when a device identifier code transmitted to the access concentrator/database from the CPE device is 111111111, the determination would be that this CPE device model type is a Netopia 3546 Router. Similarly, when the identifier code received is 000000001, the access concentrator would determine that the CPE device model type is an Efficient Networks 5861 Router.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method for identifying customer premises equipment in a distributed network, the method comprising:

generating a device identifier code that specifically identifies a product model of a customer premises equipment device in response to receiving a point-to-point over Ethernet (PPPoE) packet communicated over the distributed network;

broadcasting a point-to-point over Ethernet (PPPoE) active discovery initiation (PADI) packet, wherein the PPPoE active discovery initiation (PADI) packet includes a tag, wherein the tag is based onto device identifier code;

receiving a point-to-point over Ethernet (PPPoE) active discovery offer (PADO) packet;
transmitting a point-to-point over Ethernet (PPPoE) active discovery request (PADR) packet in response to receiving the PADO packet, wherein the PADR packet includes a tag that specifically identifies a product model of the customer premises device;
receiving a point-to-point over Ethernet (PPPoE) active discovery session (PADS) packet; and
conducting an Ethernet communication session.

2. The method of claim 1, wherein the tag is a host-uniq tag.

3. The method of claim 1, wherein the device identifier code is a nine bit binary number.

4. The method of claim 1, wherein the customer premises equipment is a device that terminates PPPoE communications.

5. The method of claim 1, further comprising receiving a point-to-point over Ethernet (PPPoE) active discovery packet that includes the tag and storing a device identifier code that identifies the product model in a database.

6. The method of claim 1, wherein the Ethernet communication session is conducted via a distributed IP network.

7. The method of claim 1, wherein the Ethernet communication session is conducted via a digital subscriber line (DSL) connection.

8. The method of claim 1, wherein the point-to-point over Ethernet active discovery offer packet is received from a broadband remote access server.

9. The method of claim 1, wherein the Ethernet communication session is conducted via an asynchronous transfer mode (ATM) connection.

10. The method of claim 1, wherein the Ethernet communication session is conducted via an asymmetric digital subscriber line (ADSL) connection.

11. A method comprising:
sending a point-to-point over Ethernet (PPPoE) active discovery packet, wherein the PPPoE active discovery packet includes a tag that specifically identifies a product model of a customer premises equipment (CPE) device; and
generating a device identifier code based on the tag in response to receiving the PPPoE active discovery packet.

12. The method of claim 11, wherein the tag is a host-uniq tag.

13. The method of claim 11, wherein the PPPoE active discovery packet is a PPPoE active discovery initiation (PADI) packet.

14. The method of claim 11, wherein the PPPoE active discovery packet is a PPPoE active discovery request (PADR) packet.

15. The method of claim 11, wherein the customer premises equipment device is a router.

16. The method of claim 11, wherein the customer premises equipment is a switch.

17. The method of claim 11, further comprising receiving a PPPoE active discovery packet.

18. The method of claim 17, wherein the PPPoE active discovery packet received is a PPPoE active discovery offer (PADO) packet.

19. The method of claim 17, wherein the PPPoE active discovery packet received is a PPPoE active discovery session (PADS) packet.

20. The method of claim 11, wherein the customer premises equipment device is an asymmetric digital subscriber line router.

21. A method comprising:
receiving a point-to-point over Ethernet (PPPoE) active discovery packet, wherein the PPPoE active discovery packet includes a tag that identifies a product model of a customer premises equipment device; and
determining the product model of the customer premises equipment device based on the tag.

22. The method of claim 21, wherein the step of determining further comprises storing the product model of the customer premises equipment device in a database.

23. The method of claim 22, further comprising managing the database based upon the product model of the customer premises equipment device.

24. The method of claim 21, wherein the PPPoE active discovery packet is a PPPoE active discovery initiation (PADI) packet.

25. The method of claim 21, wherein the PPPoE active discovery packet is a PPPoE active discovery request (PADR) packet.

26. A customer premises equipment (CPE) device comprising:
a network interface; and
a module coupled to the network interface, said module configured to transmit a point-to-point over Ethernet (PPPoE) active discovery packet including a tag, the tag comprising a device identifier field that uniquely identifies a CPE product model.

27. The customer premises equipment device of claim 26, wherein the device identifier field comprises a predefined binary number.

28. The customer premises equipment device of claim 26, wherein the tag is a host-uniq tag.

29. A system for identifying a communications device, the system comprising:
an access concentrator configured to receive an active discovery packet having a tag comprising a device identifier field, wherein the active discovery packet is arranged for transmission by a communications device capable of terminating a point-to-point connection, and wherein the communications device identifier field uniquely identifies a product model associated with the communications device; and
a database sever to store the device identifier field.

30. The system of claim 29, wherein the point-to-point connection is a point-to-point over Ethernet (PPPoE) connection.

31. The system of claim 29, wherein the access concentrator is a broadband remote access server.

32. A data packet for use in a distributed network, the data packet comprising:
an Ethertype payload field including a host-uniq tag value indicating a model type of a digital switching device.

33. The data packet of claim 32, further comprising:
a service provider destination address, the service provider destination address associated with a destination node within the distributed network; and
a service provider source address, the service provider source address associated with a storage device at a source node within the distributed network.

34. The data packet of claim 33, wherein the distributed network is an Ethernet distributed network.

35. The data packet of claim 33, wherein the model type of the digital switching device is a nine bit binary device identifier code associated with customer premises equipment.

* * * * *